United States Patent [19]

Houston

[11] 4,353,724
[45] Oct. 12, 1982

[54] METHOD FOR FORMING MINERAL FIBERS

[75] Inventor: Robert L. Houston, Newark, Ohio

[73] Assignee: Owens-Corning Fiberglas Corporation, Toledo, Ohio

[21] Appl. No.: 251,590

[22] Filed: Apr. 6, 1981

[51] Int. Cl.³ .......................................... C03B 37/04
[52] U.S. Cl. .................................. 65/8; 65/6; 65/12; 65/326
[58] Field of Search .............. 65/6, 8, 14, 15, 83, 65/19, 326, 12, 327

[56] References Cited

U.S. PATENT DOCUMENTS

| | | | |
|---|---|---|---|
| 2,609,566 | 9/1952 | Stalego | 65/6 |
| 3,014,235 | 12/1961 | Snow | 65/6 |
| 3,149,944 | 9/1964 | Leaman | 65/6 X |
| 3,179,507 | 4/1965 | Levecque et al. | 65/14 X |
| 3,304,164 | 2/1967 | Charpentier et al. | 65/8 X |
| 3,337,316 | 8/1967 | Fletcher et al. | 65/6 X |
| 3,347,648 | 10/1967 | Krakauer et al. | 65/14 X |
| 3,542,533 | 11/1970 | Hesse | 65/15 |
| 3,775,076 | 11/1973 | Pallo | 65/15 X |
| 4,116,621 | 9/1978 | Bassel | 65/326 |
| 4,152,131 | 5/1979 | Gogneraude | 65/19 |

FOREIGN PATENT DOCUMENTS

| | | | |
|---|---|---|---|
| 227311 | 10/1958 | Australia | 65/8 |
| 531899 | 10/1956 | Canada | 65/6 |

*Primary Examiner*—Robert L. Lindsay, Jr.
*Attorney, Agent, or Firm*—Ronald C. Hudgens; Philip R. Cloutier; Ted C. Gillespie

[57] ABSTRACT

A method and apparatus for fiberizing molten mineral material of the type in which molten mineral material is supplied to a spinner and centrifuged by the spinner into mineral fibers, is characterized by fiberizing the molten mineral material at a temperature below the liquidus temperature of the molten mineral material.

7 Claims, 4 Drawing Figures

METHOD FOR FORMING MINERAL FIBERS

TECHNICAL FIELD

This invention pertains to forming fibers from molten mineral material, such as forming glass fibers from molten glass for insulation products. In one of its more specific aspects, this invention relates to supplying molten mineral material to a centrifuge, and centrifuging the molten mineral material into mineral fibers.

BACKGROUND OF THE INVENTION

A common practice in forming fibers of mineral material, such as glass, is to discharge molten glass from a forehearth into a rotating centrifuge or spinner. The molten glass flows across the spinner bottom wall to the spinner peripheral wall and passes in a molten state through the orifices of the spinner peripheral wall to create primary fibers. Thereafter, the primary fibers are usually further attenuated into a veil of secondary fibers of smaller diameter by the action of a downward flow of gases. Hot gases from an annular burner maintain the spinner peripheral wall at a temperature suitable for centrifuging the molten mineral material, and maintain the primary fibers emanating from the spinner in a plastic state to enable further attenuation into secondary fibers. Beneath the spinner, organic binder is sprayed onto the downwardly traveling secondary fibers.

The liquidus temperature of a glass is that temperature below which the molten mineral material begins to crystalize or devitrify. The liquidus temperatures of some high-liquidus glass compositions for glass fibers, such as E Glass, are in the neighborhood of 2000° F. It is well established that centrifugal fiberizing processes are carried out at temperatures higher than the liquidus temperature of the glass in order to avoid crystallization or devitrification of the glass within the spinner. Thus, the effective operating temperatures on the spinner peripheral wall for many high-liquidus glasses are higher than 2000° F. These high operating temperatures involved in fiberizing such high-liquidus materials result in a relatively short spinner life, and result in pollution problems due to the overheating of a portion of the binder as it is sprayed onto the fibers.

It is common to employ borates and other expensive fluxes in centrifuging glass compositions in order to lower the liquidus temperature, and thereby enable fiberization at a lower temperature. For example, in a typical, borate-containing standard wool glass composition, hereinafter disclosed, the liquidus temperature is 1742° F. Using borate fluxes to lower the liquidus temperature is not entirely satisfactory because borates are an expensive commodity being supplied in large part in only two places in the free world. Furthermore, the addition of borates in the glass batch composition creates undesirable borate-derived air pollutants.

Attempts have been made to solve the pollution and material supply problems of the above described processes and compositions. One solution is the use of more sophisticated glass compositions having little or no borate fluxes, thereby enabling operation without harmful air pollutants. Such processes and compositions invariably run hotter than processes using the standard centrifuging compositions having the borate fluxes. There is a need for a method and apparatus for fiberizing molten mineral material at high efficiencies and low temperatures, with a reduction or elimination of borate fluxes in the glass composition.

SUMMARY OF THE INVENTION

The present invention solves the above problems by conducting the fiberizing process at a temperature below the liquidus of the molten mineral material. The problem of glass divitrification within the spinner is overcome for a limited time by virtue of the fact that the glass is sufficiently cool as to inhibit molecular movement, thereby delaying the divitrification for a reasonable length of time, which may be on the order of the life of the spinner itself. The invention enables fiber glass manufacturers either to fiberize standard glasses at lower temperatures, or to fiberize glasses which have little or no borate fluxes and which can be fiberized at standard temperatures.

According to this invention, there is provided a method for fiberizing molten mineral material of the type in which the molten mineral material is supplied to a rotating spinner having an orificed peripheral wall and is centrifuged by the spinner into mineral fibers, the improvement comprising discharging the molten mineral material from the peripheral wall orifices at a temperature below the liquidus temperature of the mineral material.

In one embodiment of the invention, the molten mineral material is discharged at a temperature within the range of from about 25° F. to about 300° F. below the liquidus temperature.

In a preferred embodiment of the invention, the molten mineral material is discharged at a temperature within the range of from about 50° F. to about 75° F. below the liquidus temperature.

In a specific embodiment of the invention, the molten mineral material is discharged at a viscosity within the range of from about 5,000 to 500,000 poises.

In a preferred embodiment of the invention, the molten mineral material is discharged at a viscosity within the range of from about 10,000 to about 100,000 poises.

In another embodiment of the invention, the molten mineral material is supplied to the spinner peripheral wall at a temperature above the liquidus temperature.

In a specific embodiment of the invention, the molten mineral material is cooled from a temperature above the liquidus temperature to a temperature below the liquidus temperature by impinging a cooling fluid on either the spinner peripheral wall or the spinner bottom wall.

According to this invention, there is also provided a method for fiberizing molten mineral material of the type in which molten mineral material is discharged from a source at a temperature above the liquidus temperature, supplied to a spinner and centrifuged by the spinner into mineral fibers, where the improvement comprises cooling the molten mineral material to a temperature below its liquidus temperature prior to the introduction of the molten mineral material into the spinner. The source of molten mineral material can be a forehearth.

In a specific embodiment of the invention, the cooling is effected by passing the molten mineral material into contact with a cooling means having passageways for the passage of cooling fluid therethrough.

According to this invention, there is also provided a method for fiberizing molten mineral material of the type in which the molten mineral material is supplied to a spinner and caused to flow outwardly to the spinner peripheral wall from which the molten mineral material is centrifuged into mineral fibers, where the improvement comprises supplying the molten mineral material to the spinner at a temperature above the liquidus temperature, and cooling the molten mineral material to a temperature below the liquidus temperature before the molten mineral material is discharged from the spinner peripheral wall.

In a specific embodiment of the invention, the molten mineral material is cooled to a temperature below the liquidus temperature before the molten mineral material reaches the spinner peripheral wall.

According to this invention, there is also provided apparatus for fiberizing molten mineral material the type in which molten mineral material is discharged from a source at a temperature above the liquidus temperature, supplied to a spinner, and caused to flow outwardly to the spinner peripheral wall from which the molten mineral material is centrifuged into mineral fibers, where the improvement comprises means for cooling the molten mineral material to a temperature below the liquidus temperature before the molten mineral material is discharged from the spinner peripheral wall.

In one embodiment of the invention, the means for cooling comprises means for circulating a cooling fluid within the spinner peripheral wall.

In a specific embodiment of the invention, the means for cooling comprises means for circulating a cooling fluid within the spinner bottom wall.

In another specific embodiment of the invention, the means for cooling comprises means for blowing cooling fluid onto the molten mineral material within the spinner.

In another specific embodiment of the invention, means are provided to impinge a cooling fluid on either the spinner peripheral wall or the spinner bottom wall to cool the molten mineral material to a temperature below the liquidus temperature.

According to this invention, there is also provided apparatus for fiberizing molten mineral material of the type in which molten mineral material is supplied from a source to a spinner and centrifuged by the spinner into mineral fibers, where the improvement comprises cooling means positioned intermediate the source and the spinner to cool the molten mineral material to a temperature below its liquidus temperature. The source of molten mineral material can be a forehearth.

In a specific embodiment of the invention, the cooling means is adapted with passageways for the passage of cooling fluid therethrough.

DESCRIPTION OF THE INVENTION

The invention will be described in terms of a glass fiber forming operation, although it is to be understood that the invention can be practiced using other heat-softenable mineral material such as rock, slag and basalt.

Figure 1:
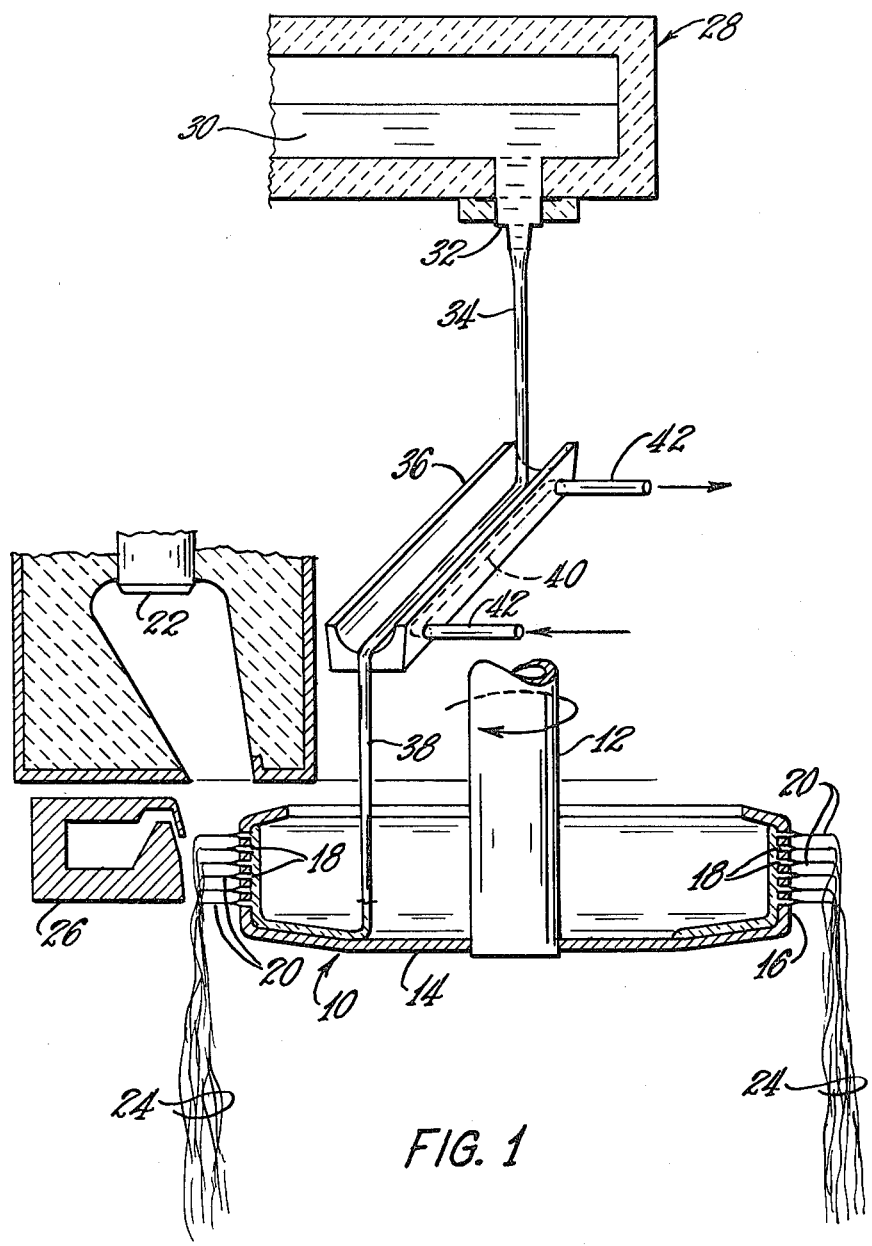
FIG. 1 is a schematic cross-sectional elevation view of apparatus for forming mineral fibers according to the principles of this invention.

As shown in FIG. 1, spinner 10 is mounted for rotation on quill 12 and can be comprised of spinner bottom wall 14 and peripheral wall 16, which has orifices 18 positioned therein. Molten glass dropping into the spinner impinges on the spinner bottom wall and flows to the spinner peripheral wall. The glass passes through the orifices to form primary fibers 20. The primary fibers can be maintained in a plastic, attenuable condition by the heat supplied from annular burner 22. The primary fibers can be further attenuated into secondary fibers 24 by the action of high velocity gases discharged from annular blower 26. The source for the molten glass entering the spinner can be forehearth 28 containing molten glass 30, which is discharged via bushing 32 in the form of hot glass stream 34. The temperature of the hot glass stream is above the liquidus temperature of the glass. The hot glass stream passes into contact with cooling trough 36 which lowers the temperature of the glass to a temperature below the liquidus temperature. The result is relatively cool glass stream 38 which is introduced into the spinner, preferably at a temperature within the range of from about 25° F. to about 300° F. below the liquidus temperature. Most preferably, the temperature of the cool glass stream will be within the range of from about 50° F. to about 75° F. below the liquidus temperature. Any means suitable for cooling the hot glass stream exiting the forehearth bushing to a temperature sufficiently below the liquidus will be sufficient for purposes of the invention. Where a cooling trough is used, the heat transfer from the glass into the cooling trough can be controlled by the circulation of cooling fluid through cooling fluid passageway 40 connected by inlet and outlet conduits 42 to a source of cooling fluid, not shown.

Figure 2:
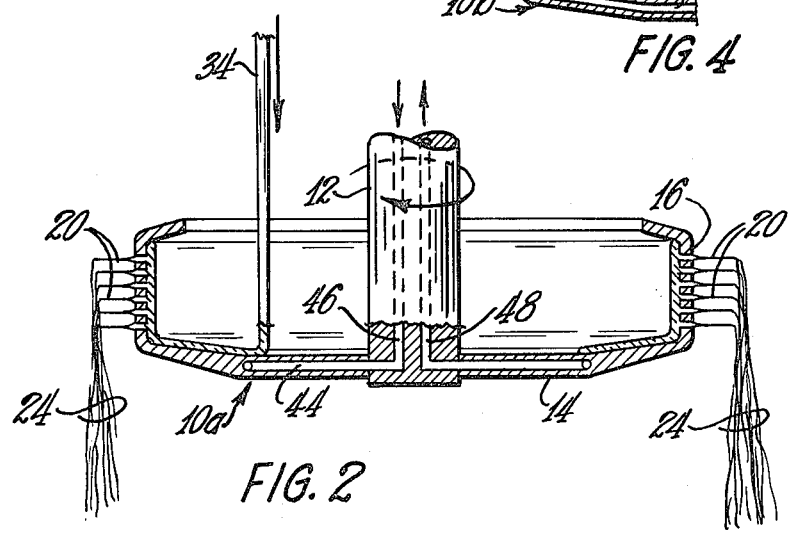
FIG. 2 is a schematic plan view illustrating additional embodiments of the cooling means for the molten mineral material of the invention.

As shown in FIG. 2, spinner 10a can utilize a cooling fluid flowing through the spinner bottom wall to cool the hot glass stream before the glass reaches the spinner peripheral wall. The spinner bottom wall is adapted with cooling fluid veins 44 which cool the molten glass on the bottom wall. The veins can have a circular shape to enable cooling fluid to circulate to a position beneath the molten glass impinging upon the spinner bottom wall. The veins can be supplied from a source of cooling fluid, not shown, via inlet coolant passage 46 and outlet coolant passage 48. Thus, hot glass entering the spinner at a temperature above the liquidus temperature of the glass is cooled within the spinner to a temperature below the liquidus temperature of the glass, and fiberization occurs at that cooled temperature.

Figure 3:
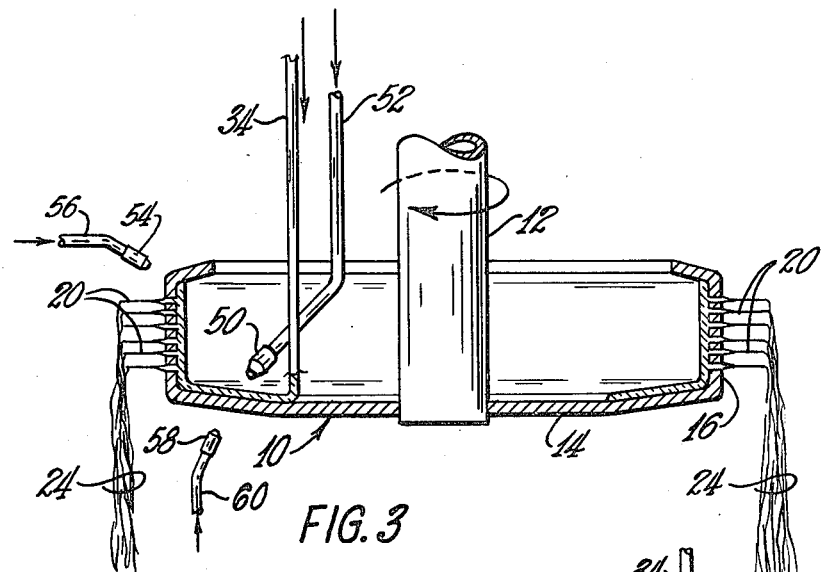
FIG. 3 is a schematic view illustrating another embodiment of the cooling means of the invention.

In FIG. 3, there is shown another embodiment of means for cooling the glass within the spinner. The spinner is adapted with nozzle 50, which is supplied with a cooling fluid, such as air, from a source, not shown, via supply line 52. Cool air blowing on the hot glass within the spinner lowers the temperature of the glass to a temperature below the liquidus temperature. The volume, velocity and temperature of the cooling air will affect the heat transfer from the molten glass.

Also shown in FIG. 3 is nozzle 54, which can be employed to direct a cooling fluid, such as air, to impinge on the outside of the spinner peripheral wall. The nozzle can be supplied via conduit 56 from a source not shown.

Also shown in FIG. 3 is nozzle 58, which can be employed to direct a cooling fluid, such as air, to impinge on the outside of the spinner bottom wall. The nozzle can be supplied via conduit 60 from a source not shown.

Figure 4:
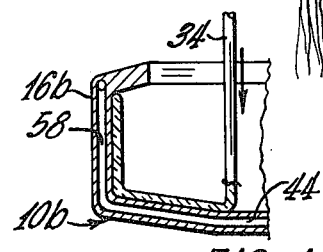
FIG. 4 is a schematic view illustrating yet another embodiment of the cooling means of the invention.

As shown in FIG. 4, spinner 10b can have relatively thick peripheral wall 16b to enable peripheral wall cooling vein 58 to be positioned in the peripheral wall. The cooling vein is adapted to cool the glass from a temperature above the liquidus temperature to a temperature below the liquidus temperature as the glass passes through the orifices in the spinner peripheral wall. Preferably, a plurality of veins adapted with recirculation means, not shown, are employed.

In order for the invention to successfully operate, the glass must have a temperature which is low enough to greatly retard devitrification. In a preferred embodiment of the invention, the temperature will be such that the viscosity will be within the range of from about 5,000 to 500,000 poises. Preferably, the viscosity of the molten mineral material will be within the range of from about 10,000 to about 100,000 poises. In order to compensate for the increased viscosity of the glass, it may be necessary for the rotational rate, diameter of the holes and number of holes to be greater than that used in standard centrifuging operations.

EXAMPLE 1

A typical, standard wool glass has the following composition:

| Ingredient | Weight Percent |
|---|---|
| $SiO_2$ | 61.2 |
| $Al_2O_3$ | 4.1 |
| $Na_2O$ | 14.7 |
| $K_2O$ | 1.1 |
| CaO | 7.8 |
| MgO | 3.4 |
| $B_2O_3$ | 7.3 |
| $Fe_2O_3$ | 0.2 |

The viscosity of log $n=2.5$ is at a temperature of 2098° F., and the liquidus temperature is 1742° F. Typically, this glass is centrifuged with a spinner peripheral wall temperature of about 1825° F., or higher. Application of the invention utilizing this standard wool glass would enable the cooling of the spinner peripheral wall to a temperature of approximately 1650° F. At that temperature, the viscosity would be on the order of 15,000 poises. To fiberize the glass at that viscosity, a 12 inch spinner using 20,000 holes and having a hole diameter of 0.036 inch and a spinner wall thickness of 0.1 inch would require a rotational rate of about 3340 revolutions per minute. The head of glass on the inside of the spinner peripheral wall would be approximately 0.5 inch. Such a spinner would fiberize glass at the rate of approximately 1,200 pounds per hour. Thus, a fiberizing environment which is about 175° F. cooler than that of a standard process would be created, resulting in less binder burn off and a reduced amount of air pollutants.

EXAMPLE 2

E glass is a known electrically resistant textile glass and is essentially a low alkyl alkaline earth aluminoborosilicate glass. The liquidus temperature of E glass is approximately 1970° F. Centrifuging E glass according to the principles of this invention would require fiberization of the glass at a temperature below the liquidus temperature. For example, E glass might be fiberized at a temperature of 1900° F. At that temperature the viscosity would be approximately 26,000 poises.

EXAMPLE 3

A glass composition suitable for centrifuging glass fibers, and having no boron fluxes, has the following composition:

| Ingredients | Weight Percent |
|---|---|
| $SiO_2$ | 57.0–62.0 |
| $Al_2O_3$ | 4.0–5.0 |
| $Na_2O$ | 19.0–22.0 |
| $K_2O$ | 0.0–1.5 |
| CaO | 8.0–13.0 |
| MgO | 1.5–6.5 |

The total amount of CaO and MgO is at least 10.0 weight percent and the total amount of $Na_2O$ and $K_2O$ is at least 18.0 weight percent. The viscosity of log $n=2.5$ is at a temperature of 2200° F. or less, and the liquidus temperature is 2000° F. Attempting to centrifuge this glass under the standard practices of the prior art would necessitate operation with a spinner peripheral wall temperature of 2050° F. or more. Application of the principles of this invention to this glass, however, would enable the spinner peripheral wall temperature to be lowered to about 1900° F., thereby requiring a lower amount of energy and producing a lower amount of air pollutants.

INDUSTRIAL APPLICABILITY

This invention will be found to be useful in the formation of fibers from molten glass for such uses as glass fiber thermal insulation products and glass fiber acoustical insulation products.

What is claimed is:

1. In a method of fiberizing molten mineral material of the type in which molten mineral material is supplied to a spinner and caused to flow outwardly to the spinner peripheral wall, from which the molten mineral material is centrifuged into mineral fibers, the improvement comprising supplying the molten mineral material to said spinner at a temperature above the liquidus temperature, and cooling the molten mineral material to a temperature below the liquidus temperature before the molten mineral material is discharged from said spinner peripheral wall.

2. The method of claim 1 in which the molten mineral material is cooled to a temperature below the liquidus temperature before the molten mineral material reaches said spinner peripheral wall.

3. The methods of claim 1 comprising discharing the molten mineral material at a viscosity within the range of from about 5,000 to about 500,000 poises.

4. The method of claim 3 comprising discharging the molten mineral material at a viscosity within the range of from about 10,000 to about 100,000 poises.

5. The method of claim 1 in which the molten mineral material is supplied to the spinner peripheral wall at a temperature above said liquidus temperature.

6. The method of claim 5 comprising cooling the molten mineral material from a temperature above said liquidus temperature to a temperature below said liquidus temperature by impinging a cooling fluid on the exterior of the spinner peripheral wall.

7. The method of claim 1 comprising cooling the molten mineral material from a temperature above said liquidus temperature to a temperature below said liquidus temperature by impinging a cooling fluid on the exterior of the spinner bottom wall.

* * * * *